United States Patent [19]

Lill et al.

[11] 4,344,234

[45] Aug. 17, 1982

[54] APPARATUS AND METHOD FOR MEASURING REAR WHEEL TOE WITH RESPECT TO CHASSIS CENTERLINE

[75] Inventors: Melvin H. Lill, San Jose; Thomas E. Roberts, Jr., Saratoga, both of Calif.

[73] Assignee: FMC Corporation, Chicago, Ill.

[21] Appl. No.: 184,431

[22] Filed: Sep. 4, 1980

[51] Int. Cl.³ ............................................ G01B 11/275
[52] U.S. Cl. .................................. 33/228; 33/203.18; 33/288; 356/155
[58] Field of Search ................... 33/203, 203.18, 203.2, 33/288, 336, 337; 356/155

[56] References Cited

U.S. PATENT DOCUMENTS

| | | | |
|---|---|---|---|
| 2,401,715 | 6/1946 | Wilkerson | 33/203 |
| 2,575,194 | 11/1951 | Smith | 33/288 |
| 3,151,396 | 10/1954 | Junkins | 33/288 |
| 3,417,479 | 12/1968 | Hirmann | 33/203.2 X |
| 3,983,635 | 10/1976 | Jarman | 33/288 |
| 4,095,902 | 6/1978 | Florer et al. | 356/155 |
| 4,159,574 | 7/1979 | Samuelsson et al. | 33/288 |

OTHER PUBLICATIONS

Hunter, Electron-A-Line Brochure, pp. 2, 3 and 5, Oct. 1976.

Primary Examiner—William D. Martin, Jr.
Attorney, Agent, or Firm—H. M. Stanley; R. B. Megley

[57] ABSTRACT

An electronic aligner head is mounted on one rear wheel of a vehicle. The aligner head projects a light beam toward the front wheel on the same side of the vehicle. A centering gage is adapted to contact lower points on the inner flanges of each of the rear wheel rims. A lateral arm is connected to a housing on the centering gage. The lateral arm extends past the one rear wheel and carries a centering gage head on the free end. The arm is adjustable in length to place the centering gage head at the same lateral distance from the chassis centerline as the light beam projector. The centering gage is removed from the position between the rear wheel rims and placed in a similar position between the front wheel rims. The centering gage head is configured to either reflect the beam back to a light beam detector on the aligner head or alternatively to direct the beam to a detector in the gage head. The detector provides a signal indicative of the toe of the one rear wheel.

17 Claims, 8 Drawing Figures

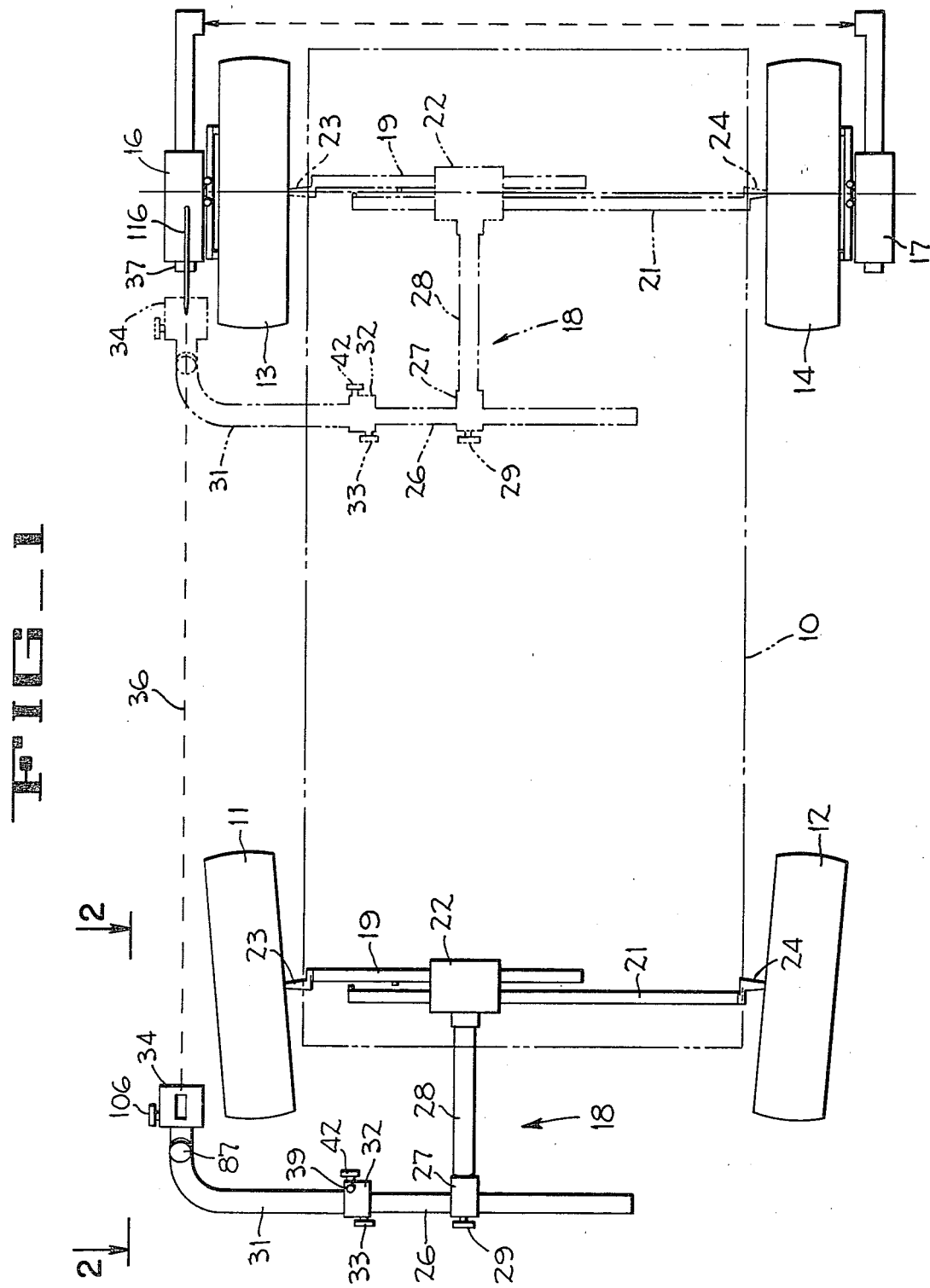

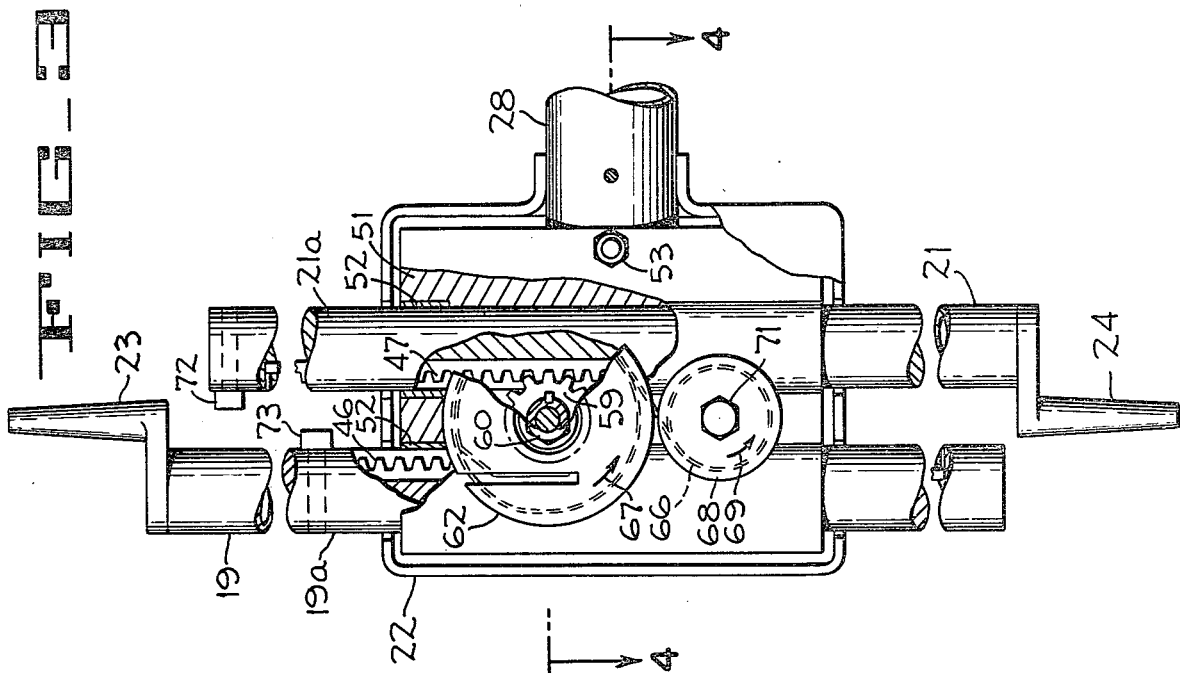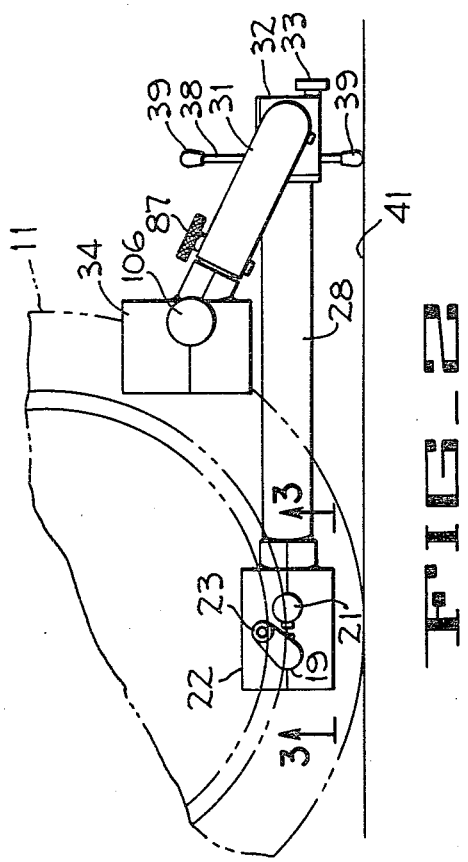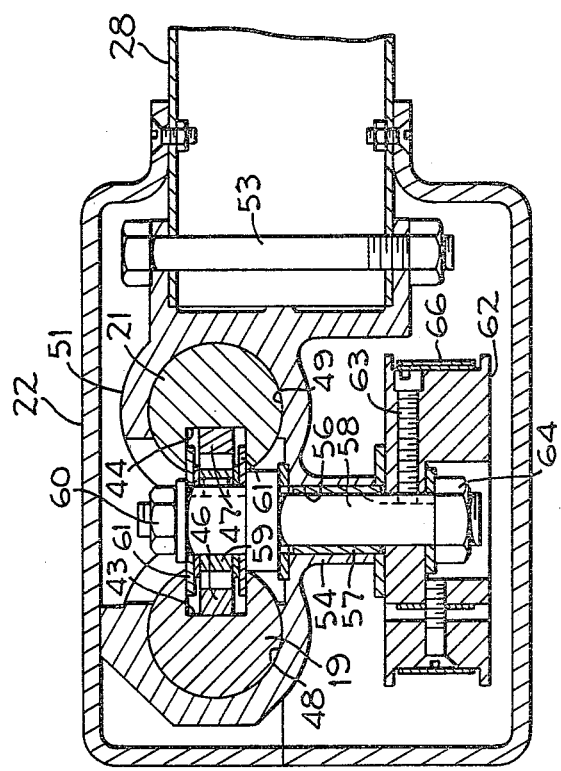

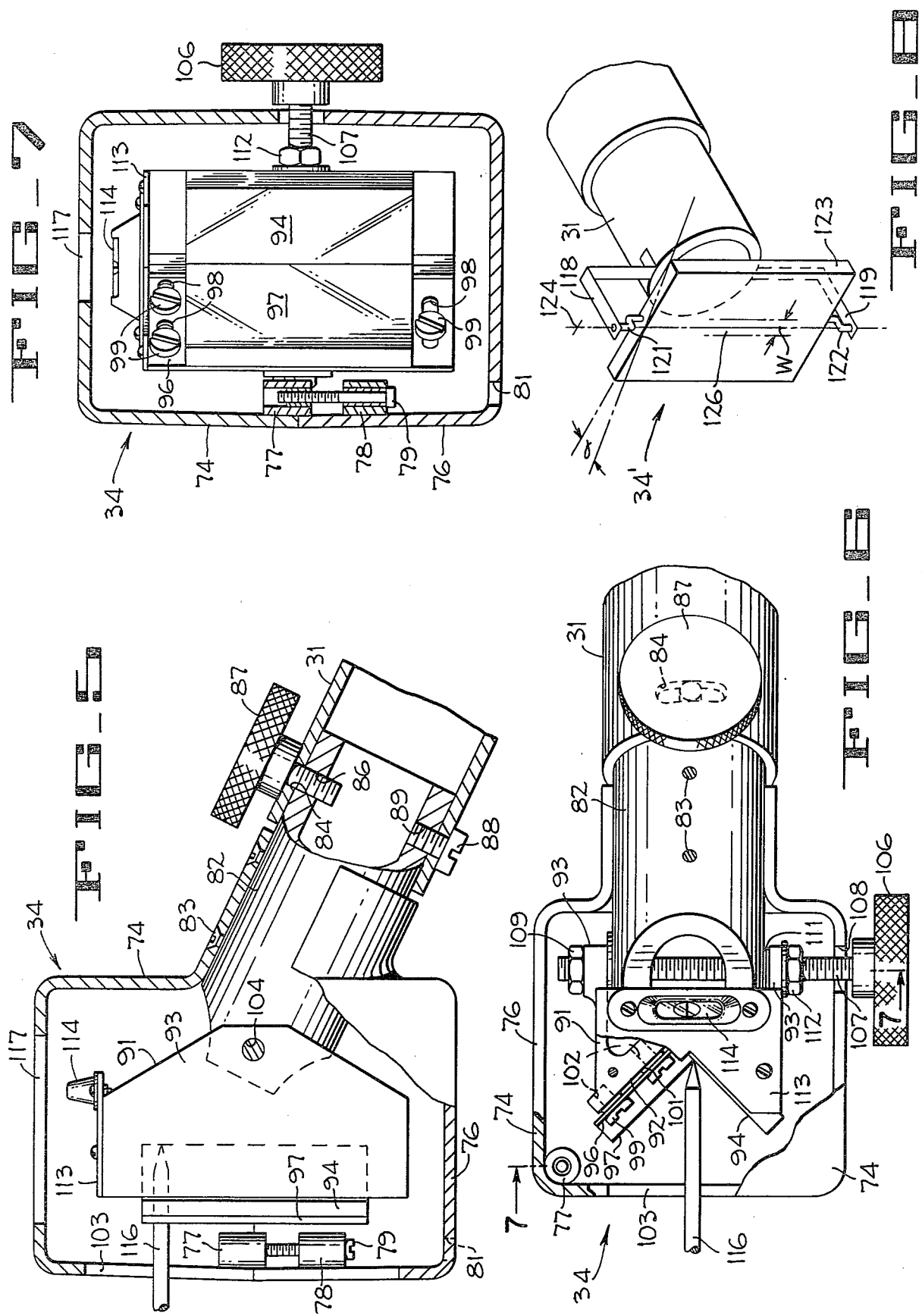

APPARATUS AND METHOD FOR MEASURING REAR WHEEL TOE WITH RESPECT TO CHASSIS CENTERLINE

BACKGROUND OF THE INVENTION

1. Field of the Invention

The present invention relates to an apparatus and method for measuring the individual toe angle of nonsteerable rear wheels on a vehicle, and more particularly to such apparatus and method for measuring individual toe angles of the rear wheels relative to a chassis centerline reference.

2. Description of the Prior Art

An electronic wheel aligner for measuring the toe of the front wheels with respect to the rear wheel axis of rotation is disclosed in U.S. Pat. No. 4,097,157, Lill. When the aligner heads are mounted on the rear wheels the system disclosed in the aforementioned U.S. Patent cannot determine the individual rear wheel toe because the reflector disclosed therein which provides the rear wheel rotation axis reference would then be mounted on a steerable front wheel having a movable rotation axis.

"Centering gages" for vehicle frames have been described in the past as for example in U.S. Pat. No. 3,151,396, Junkins. The gage disclosed by Junkins has a housing with a pair of elongate parallel bars which are simultaneously movable longitudinally in opposite directions within the housing. The outer end of each bar has a hanger attached thereto so that the end of each bar may be hung from opposite side beams on the vehicle frame. A rod is mounted on the housing which is always at the midpoint between the ends of the movable parallel bars since the ends of the bars either converge or diverage at the same rate due to an array of cables and rollers mounted within the housing.

Another "centering gage" is disclosed in U.S. Pat. No. 3,417,479, Hirmann, which includes members near the outer ends of the assembly which contact the vehicle chassis at similar points on opposite sides of the chassis. Telescoping end members are provided to move longitudinally on each end of a tubular center member in the Hirmann gage. A rack is attached to each of the telescoping end members extending into the center member. A pinion is mounted within the center member which is meshed with each of the two racks. Thus, when one telescoping end member is moved longitudinally either toward or away from the center of the gage, the pinion is rotated thereby driving the other telescoping end member toward or away from the center of the gage synchronously with the one telescoping end member. An optical path is aligned with the center point of the central member so that a line of sight is provided along the chassis centerline when the feeler members are in contact with opposite sides of the chassis.

SUMMARY OF THE INVENTION

The present invention is directed to apparatus for measuring the toe of one of a pair of nonsteerable wheels on a vehicle relative to the centerline of the vehicle chassis. An alignment head is mounted on the one nonsteerable wheel. The alignment head projects a light beam toward the front wheels supporting the chassis in a direction wherein the beam axis is substantially parallel to the plane of rotation of the one nonsteerable wheel. A light beam detector is provided in the vertical plane which extends through the projector parallel to the chassis centerline. A centering gage is adapted to be positioned between any pair of vehicle wheels. When the centering gage is positioned between a wheel pair, a housing on the gage maintains a constant position relative to the center point between the wheels. A laterally extending arm is mounted on the housing having an outer end which reaches outboard of one of the wheels in the pair. A centering gage head is attached to the outer end of the lateral arm and an aperture is provided in the centering gage head which operates to receive a portion of the light beam. Means is provided for adjusting the length of the laterally extending arm to place the aperture in the aforementioned vertical plane through the projector. The aperture is in optical communication with the light beam detector so that a signal indicative of the toe of the one nonsteerable wheel relative to the chassis centerline is provided in response to the sensing of the light beam.

The method for obtaining toe measurement of one nonsteerable wheel with respect to the centerline of a vehicle chassis supported by a pair of nonsteerable wheels and a pair of steerable wheels involves the use of a light beam projector which is mounted on the one nonsteerable wheel and which is disposed to project a beam of light substantially parallel to the wheel rotation plane in the general direction of the steerable wheels. A light beam detector is disposed in the path of the light beam which provides an output signal when excited by a portion of the beam. An aperture is disposed between the projector and the detector. The method includes the steps of determining the lateral distance of the point of projection of the light beam from the center point between the nonsteerable wheels. The method further includes the step of positioning the aperture remote from the point of projection on a line from the point of projection through a point at the aforesaid lateral distance from the center point between the steerable wheels. Subsequently, adjustment is made to the attitude of the aperture so that the projected beam is admitted to the beam detector, whereby the detector output signal is indicative of the angle of variation of the detected beam from a line through the center points between the wheel pairs.

BRIEF DESCRIPTION OF THE DRAWINGS

FIG. 1 is a plan view of a vehicle chassis wherein the apparatus and method of the present invention are used to ascertain individual rear wheel toe.

FIG. 2 is a side elevational view along the line 2—2 of FIG. 1.

FIG. 3 is a partially cut-away bottom view along the line 3—3 of FIG. 2.

FIG. 4 is a side elevational view in section taken along the line 4—4 of FIG. 3.

FIG. 5 is a side elevational view in partial section of the centering gage head of the present invention.

FIG. 6 is a plan view of the centering gage head of the present invention with the top cover partially removed.

FIG. 7 is an elevational view in section along the line 7—7 of FIG. 6.

FIG. 8 is a perspective view of an alternative embodiment of the centering gage head.

DESCRIPTION OF THE PREFERRED EMBODIMENTS

In FIG. 1 a general outline of a chassis 10 of a vehicle is shown in phantom lines. The chassis is supported at the forward end by a pair of steerable wheels 11 and 12 and at the rear end by a pair of nonsteerable wheels 13 and 14. An electronic aligner head 16 is shown mounted on the nonsteerable wheel 13 and a similar electronic aligner head 17 is shown mounted on the nonsteerable wheel 14. An aligner head, projector and detector which may be used in conjunction with the apparatus and method set forth in this disclosure is fully described in U.S. Pat. No. 4,180,326, Chang. This aligner head may be modified to provide a beam projector which directs a beam toward the opposite end of the chassis from the end on which the aligner head is mounted as shown by the disclosure of U.S. Pat. No. 4,097,157, Lill. The aligner heads containing light beam projectors and associated beam detectors are known in this field and form no part of this invention.

A centering gage assembly 18 is shown in solid lines disposed between the steerable wheels 11 and 12 on the chassis 10 (FIG. 1). The centering gage assembly includes a first elongate arm member 19 and a second elongate arm member 21. The arm members extend through a centering gage housing 22 in which they are engaged and guided by mechanism to be hereinafter described. The elongate arm 19 has a tip 23 thereon at the outer end which is disposed to be colinear with a tip 24 at the outer end of elongate arm 21. The mechanism within the housing is such that the tip or support ends 23 and 24 of the respective arm members move simultaneously toward and away from each other at the same rate. As a consequence, the housing 22 always occupies the same position relative to a mid-point between the ends of the tips 23 and 24. The tips are yieldably urged away from each other by means contained within the housing also to be hereinafter described.

A laterally extending arm 26 extends through a collar 27 on the end of a forwardly extending arm 28 which is attached at the end remote from the collar to the housing 22. A knurled adjustment knob 29 has a threaded shank thereon which engages threads in a hole extending radially through the collar 27. The threaded shank bears against the outer surface of the lateral arm 26 to fix it in lateral position in the collar. A lateral extension 31 is coupled to one end of the lateral arm 26 by means of a collar 32 mounted on the inner end of the extension 31. The extension is a hollow tube having an inside diameter which provides a sliding fit over the outside diameter of the lateral arm 26. The extension is fixed on the lateral arm 26 by adjustment of a knob 33 having a threaded shank thereon which passes through a threaded hole in the collar 32 and bears against the outer surface of the lateral arm. The extension 31 has a right angle bend near the outer end thereof. A centering gage head 34 is mounted on the free end of the extension so that it may be disposed in the path of a light beam 36 directed toward the front of the chassis 10 from a rear mounted projector 37 on the aligner head 16. As mentioned hereinbefore, the projector may be of the type disclosed in U.S. Pat. No. 4,180,326 wherein the light beam includes a bundle of discrete beams projected at known angles relative to a centrally located reference beam.

FIG. 2 shows the manner in which the tip 23 on the elongate arm member 19 engages a lower portion of the rim on the wheel 11. The tip 24 on the elongate arm 21 engages a similar point on the lower portion of the rim of wheel 12 to thereby "hang" the parallel elongate arm members and the housing 22 from the lower portions of the rims of a wheel pair.

It should be noted in FIG. 2 that a support leg 38 is disposed vertically through the collar 32. The support leg has rubber tips 39 thereon, the lower one of which contacts a support surface 41 extending beneath the vehicle wheels, thereby serving to support the portion of the gage assembly 18 including the lateral arm 26, arm extension 31 and the centering gage head 34 above the underlying surface. It should be noted that the portion of the lateral extension 31 which is bent toward the rear of the vehicle chassis 10 is also oriented to rise as it extends rearwardly. This provides for sufficient elevation of the centering gage head 34 to position it approximately at the same height above the underlying surface 41 as the light beam projector 37. It should further be noted that an adjusting knob 42 (FIG. 1) is provided to fix the collar 32 in vertical position on the support leg 38 in the same fashion as the lateral arm 26 and extension 31 are fixed by means of knobs 29 and 33.

Turning now to FIGS. 3 and 4 the mechanism contained within the housing 22 will be described. The portion of the elongate arm members 19 and 21 to which the tips 23 and 24 respectively are attached are hollow tubes. The portion of the elongate arm members which extend into and through the housing 22 in operation of the gage are formed of solid cylindrical bars 19a and 21a which are joined to the tubular portions of the arm members. A longitudinal groove 43 is cut along one side of the bar portion 19a and a similar longitudinal groove 44 is cut along one side of the bar 21a (FIG. 4). A rack 46 is shown disposed in the groove 43 and a similar rack 47 is shown disposed in the groove 44. The portions 19a and 21a of the elongate arm members pass through cylindrical channels 48 and 49 respectively in a guide block 51. Cylindrical bearings 52 of the bronze or mixed bronze and sintered Teflon ® types are disposed in each end of the channels 48 and 49 to provide low friction seats upon which the portions 19a and 21a of the elongate arm members may move longitudinally.

The guide block 51 is attached to the end of the forwardly extending arm 28 remote from the collar 27 by means of a bolt and nut fastener 53 inserted through aligned holes in each part. A boss 54 is shown extending from the guide block 51 having a bore 56 therethrough. A cylindrical bearing 57 is disposed in the bore. The bearing supports a shaft 58 which extends through the bore and to which a pinion gear 59 is fixed at one end. The pinion gear is retained axially on the shaft by a nut 60. The gear is meshed on opposite sides with the racks 46 and 47. A large diameter washer 61 is disposed at each side of the pinion gear. The large washers are fabricated of a low friction bearing material and extend into the grooves 43 and 44. It may be seen that the portions of the washers 61 which extend into the grooves operate as guides for the elongate arm portions 19a and 21a to thereby prevent the elongate arms from rotating about their cylindrical axes.

The end of the shaft 58 remote from the pinion gear 59 has fixed thereto a spring spool 62. This spring spool is keyed to the shaft 58 by means of a radial set screw 63. The spool is secured axially on the shaft by a nut 64 which engages a threaded end on the shaft. The spool serves to backwind a negator spring 66 thereon when the tips of the elongate arms are forced to approach one another which causes spool rotation shown by an arrow 67. The spring is normally wound on an idler spool 68 in the direction of the arrow 69 by the bias of the spring. The idler spool is free to rotate about a stub shaft (not shown) extending from the guide block 51. The idler spool is secured axially on the stub shaft by means of a screw 71 engaging an axially oriented tapped hole (not shown) in the end of the stub shaft. Since the negator spring attempts to extend the elongate arms from the housing 22, a stop 72 is fixed to the free end of the elongate arm 21. This stop engages the housing at the maximum allowable extension of the arms to prevent the arms from being driven out of the housing by the spring or from extending so far that the pinion runs off of the racks. Another stop 73 is provided which engages the housing 22 at the minimum allowable extension. As a result the longitudinal motion of the elongate arms is arrested before the racks run past the pinion when the tips 23 and 24 are forced together. It may be seen that the support ends 23 and 24 of the elongate arm members 19 and 21 respectively move in unison at the same rate toward and away from each other due to the operation of the mechanism just described and contained within the housing 22.

A preferred embodiment of the centering gage head 34 is shown in FIGS. 5, 6 and 7 wherein an outer cover is formed of an upper section 74 and a lower section 76. The upper cover section has several projections 77 formed on the inner surface thereof in each of which is formed a threaded hole. The lower cover section has several projections 78 on the inner surface which register with the projections 77 and through which clearance holes are formed. A screw 79 is placed through the clearance hole in each projection 78 to engage the threaded hole in the projections 77 on the upper cover section. Access to the heads of the screws 79 are provided through holes 81 through the lower cover section.

The upper cover section has a portion extending therefrom which is formed to surround a short cylindrical stub 82 which extends into the centering gage head. The upper cover section has a pair of holes therethrough which register with a pair of tapped holes in the cylindrical stub 82 so that the cover sections may be secured to the stub by means such as the screws 83 (FIG. 5). The cylindrical stub extends beyond the extended portion of the upper and lower cover sections and engages the inside diameter at the free end of the lateral extension 31. An elongate hole 84 is formed in the upper wall near the end of the lateral extension and a threaded hole 86 is formed in that portion of the cylindrical stub underlying the elongate hole. A knurled knob 87 having a threaded shaft attached thereto extends through the elongate hole 84 to engage the threads in the hole 86. In this fashion the cylindrical stub shaft 82 may be rotated about its axis through the limits of the elongate hole 84 and fixed in position by tightening the knurled knob 87 against the outer diameter of the lateral extension 31. For purposes of securely fixing the cylindrical stub within the inner diameter of the extension 31, another elongate hole (not shown) similar to hole 84 is formed in the opposite side of the extension 31 and a pan head screw 88 is inserted therethrough to engage threads in a hole 89 also formed in the cylindrical stub.

A mirror mount 91 is attached to the end of the cylindrical stub which extends inside of the centering gage head (FIGS. 5 and 6). The mirror mount has a surface 92 which is formed at an angle of approximately 45° relative to a pair of rearwardly extending legs 93. Another surface (not shown) is formed at substantially 90° from the surface 92 and a planar first surface mirror 94 is fixed thereto. The surface of the mirror 94 is therefore approximately orthogonal to the surface 92.

A mirror mount plate 96 has fixed thereto a second first surface mirror 97. The mirror mounting plate has three elongate holes 98 formed therein, two above and one below the mirror 97. A pan head screw 99 is disposed through each of the elongate holes in the mounting plate. An O-ring 101 is placed around the threaded shank of each of the screws 99 and the screws are engaged in threaded holes 102 through the surface 92 in the mirror mount 91. As a consequence, the angle of the first surface mirror 97 relative to the first surface mirror 94 may be adjusted slightly by compressing the O-rings 101 between the mirror mounting plate 96 and the surface 92 through adjustment of the screws 99. This calibration of the orthogonality between the two mirrors is undertaken at assembly of the centering gage head 34. An opening 103 is provided in the covers 74 and 76 overlying the mirrors so that a projected light beam may impinge upon the orthogonally oriented mirror set.

The legs 93 on the mirror mount 91 have aligned holes therethrough which register with a pair of aligned holes 104 in the end of the cylindrical stub 82 which is positioned inside the covers of the centering gage head. A knurled adjustment knob 106 having a threaded shank 107 extending therefrom passes through an opening 108 in the covers and through the aligned holes in the legs 93 and the cylindrical stub 82. The hole through one of the legs 93 is threaded. The threaded shank is turned into the threaded hole and a nut 109 is turned onto the threaded shank so that the nut is locked to the leg 93 in which the threaded hole is located (FIG. 6). A pair of spring washers 111 surrounds the threaded shank 107 and is disposed between the opposite leg 93 and the cylindrical stub 82. A nut 112 is turned onto the threaded shank 107 to slightly compress the spring washers. Turning the knurled knob 106 thus adjusts the mirror mount 91 rotationally about the axis of the threaded shank 107.

A level mount plate 113 is attached to the upper surface of the mirror mount 91 as seen in FIGS. 5 and 6. A level 114 is mounted on the level mount plate and disposed so that the apex of the mirrors 94 and 97 may be adjusted to lie in a vertical plane. The adjustment is accomplished by loosening the knurled knob 87 and rotating the head 34 about the cylindrical axis of the extension 31 until a level indication is obtained from the level 114.

Referring back to FIG. 1 the manner in which the apparatus just described is utilized to obtain a measurement of the toe of an individual nonsteerable wheel will be described. Initially the electronic aligner head 16 is mounted on the nonsteerable wheel 13 so that a light beam is projected in a direction such that a reference axis along the beam is substantially parallel to the plane of rotation of the wheel 13. The beam is directed toward the front of the vehicle as represented by the light beam 36 in FIG. 1. The centering gage assembly 18 is placed as shown in dashed lines in FIG. 1 between the lower portions of the inner surfaces of the rims of the nonsteerable wheel pair 13 and 14. The housing 22, due to the aforedescribed nature of the centering gage, is in a position which is constant relative to a center point between the free ends of the elongate arms 19 and 21. A coarse lateral adjustment for the laterally extending arm 26 may then be made as described hereinbefore by releasing the adjustment knob 29, sliding the arm 26 to a desired position in the collar 27 and subsequently tightening the adjustment knob 29 to lock the lateral arm 26 in place. A fine lateral adjustment for the position of the centering gage head 34 is then made by loosening the adjustment knob 33 and moving the lateral extension 31 on the arm 26. A mechanical pointer 116 is fixed on the case of the aligner head 16 to indicate a point in the plane which includes the beam reference axis. The pointer is directed through the opening 103 in the centering gage head and brought to bear against the apex of the reflecting surfaces 97 and 94 as shown in FIGS. 5 and 6. The adjustment knob 33 is tightened to fix the centering gage head in this lateral position.

The centering gage assembly 18 is thereafter removed from between the nonsteerable wheels 13 and 14 and placed as shown in solid lines in FIG. 1 between the steerable wheels 11 and 12. No further lateral adjustments are made for the centering gage head 34. The adjustment knob 87 is loosened and the centering gage head is rotated about the cylindrical axis through the end of the lateral extension 31 until the level 114 as viewed through an upper opening 117 in the upper head cover indicates that the apex of the reflecting surfaces 97 and 94 is in a vertical plane.

The characteristics of a reflector comprising orthogonally oriented reflective surfaces are fully explained in U.S. Pat. Nos. 4,150,897 and 4,097,157 and will not be discussed in detail here. In brief summary, although a true retroreflector includes three mutually orthogonal reflective surfaces arranged to represent the junction of three surfaces of a cube as viewed from inside the cube, the term retroreflector will also be used for the purposes of this disclosure to describe a reflector with two mutually orthogonal surfaces when the light beam to be reflected approaches in a plane which is nearly orthogonal to the two surfaces. With the means disclosed herein for adjustment of the attitude of the two mutally orthogonal reflecting surfaces a retroreflecting function is obtained. It should be understood that a three surface true retroreflector could be used in this application as well as the retroreflector defined and disclosed hereinbefore.

The retroreflector forms what may be termed an aperture at the apex of the intersecting reflecting surfaces. The aperture is intercepted by a vertical plane passing through the point from which the light beam is projected and which is parallel to the centerline of the chassis 10. Consequently, the aperture admits (reflects) a portion of the beam to a detector (not shown) which in this embodiment is located adjacent to the projector 37 on the aligner head 16. The detector provides a signal indicative of the angle formed between the reflected portion of the beam admitted by the aperture and the chassis centerline reference and is therefore indicative of the angle (in a substantially horizontal plane) between the plane of rotation of the nonsteerable wheel 13 and the centerline reference. The angle indicative signal may be obtained as described in U.S. Pat. No. 4,180,326 mentioned hereinbefore.

Referring now to FIG. 8 an alternative embodiment of the invention is shown wherein an upper bracket 118 and a lower bracket 119 are attached to the free end of the lateral extension 31. The alternative form of the centering gage head is indicated as item 34'. An upper offset pivot 121 and a lower offset pivot 122 extend between the brackets 118 and 119 respectively to opposite ends of a plate 123. The pivots are positioned to support the plate so that the front face thereof is substantially vertical. By virtue of the offset in the upper and lower pivots the plate 123 is brought to rotate about a substantially vertical axis 124 which extends along the front surface of the plate 123. A narrow vertically disposed reflecting band 126 having a width indicated as w is located on the face of the plate 123. When the mechanical pointer 116 is brought to bear against the center of the reflective area w at the axis 124 with the centering gage head 34' in the position as shown in dashed lines in FIG. 1, the lateral adjustment of the head 34' is correct. The centering gage assembly 18 is thereafter placed as shown in solid lines in FIG. 1 and the plate 123 is rotated slightly from the position shown in FIG. 8 (for example through the small angle alpha) until that portion of the projected light beam which impinges on the narrow band w is reflected back to the detector mounted in the aligner head 16 and a signal is obtained from the detector. The signal produced by the detector will provide the individual toe reading for the nonsteerable wheel 13 in the manner disclosed in the aforementioned U.S. Pat. No. 4,180,326. The width w of the reflective strip 126 represents the aperture which admits the appropriate portion of the projected beam to the detector.

A third embodiment is disclosed herein which requires the detector to be mounted in the centering gage head 34. Appropriate signal conductors (not shown) are provided between the centering gage head and the aligner head 16. The reflecting surfaces 94 and 97 as seen in FIG. 7 are removed from the centering gage head and the detector is placed therein so that the center of the detector face is in substantially the same position as the apex of the mirrors 94 and 97. The mechanical pointer 116 is brought to bear against the center of the detector face when the centering gage assembly 18 is disposed as shown in dashed lines in FIG. 1. Thereafter, when the centering gage assembly is moved to the position represented by solid lines in FIG. 1 the signal produced by the detector mounted in the centering gage head will provide toe angle information as described in the previously mentioned U.S. Pat. No. 4,180,326. The aperture for admitting the appropriate portion of the projected beam 36 to the detector is determined in this instance by the width of the detector face. It may therefore be seen that in all three of the embodiments described herein there is included a projector which projects a light beam, a detector which receives a portion of the light beam, and an aperture disposed between the projector and the detector to admit the appropriate portion of the light beam to the detector.

Although the best mode contemplated for carrying out the present invention has been herein shown and described, it will be apparent that modification and variation may be made without departing from what is regarded to be the subject matter of the invention.

What is claimed is:

1. Apparatus for measuring the toe of one of a pair of nonsteerable wheels on a vehicle relative to the centerline of the vehicle chassis, wherein an alignment head is mounted on the one nonsteerable wheel casting a light beam forwardly of the chassis in a direction substantially parallel to the plane of rotation of the one wheel, wherein a light beam detector is provided in a vertical plane through the projector extending parallel to the chassis centerline, and wherein a centering gage is adapted to extend between any pair of vehicle wheels, said centering gage comprising a housing, means for maintaining said housing in a constant position relative to the center point between the any pair of vehicle wheels, a laterally extending arm mounted on said housing having an outer end reaching outboard of one of the wheels in the pair, a centering gage head attached to said outer end of said arm and having an aperture thereon operating to receive a portion of the light beam, means for adjusting the length of said laterally extending arm to place said aperture in the aforesaid vertical plane parallel to the chassis centerline, said aperture being in optical communication with the light beam detector, whereby a signal indicative of the toe of the one nonsteerable wheel relative to the chassis centerline is provided in response to sensing of said light beam portion.

2. Apparatus as in claim 1 wherein the light beam detector is in the alignment head, wherein said centering gage head further comprises two or more mutually orthogonal reflecting surfaces, and wherein said aperture comprises the width of the image of the light beam detector at the apex of said reflecting surfaces.

3. Apparatus as in claim 1 wherein the light beam detector is in said centering gage head, and wherein said aperture comprises the width of the detector face.

4. Apparatus as in claim 1 wherein the light beam detector is in the alignment head, wherein said centering gage head further comprises a narrow reflecting surface, and means for pivoting said reflecting surface about a substantially vertical axis, and wherein said aperture comprises the width of said reflecting surface.

5. Apparatus providing a vehicle chassis centerline directional reference for use with a vehicle wheel alignment head adapted to be mounted on a vehicle wheel the alignment head having a light beam projector therein operating to project a light beam having a beam reference axis oriented in a direction parallel to the wheel plane of rotation and extending longitudinally relative to the vehicle chassis, and also having a light beam detector adjacent to the projector, said apparatus comprising first and second elongate parallel arm members, a support end on each of said arm members, means for engaging said first and second arm members and for allowing longitudinal motion therebetween so that said support ends of said arm members move simultaneously at the same rate toward and away from each other, a support arm attached to said means for engaging and extending laterally relative to the chassis, a reflector mounted on the laterally extending end of said support arm, and means for adjusting the length of said support arm so that said reflector is disposed at the same distance from the chassis centerline as the light beam projector.

6. Apparatus as in claim 5 wherein said means for engaging includes a spring operating to urge said support ends of said arm members away from each other.

7. Apparatus as in claim 5 together with means mounted on said support arm for adjusting said reflector to assume a predetermined attitude relative to the vertical.

8. Apparatus as in claim 7 wherein said reflector comprises a retroreflector.

9. Apparatus as in claim 8 wherein said retroreflector comprises first and second orthogonally disposed reflecting surfaces, and said means for adjusting the attitude of said reflector comprises a first releasable lock operating to secure the apex of said reflecting surfaces in a substantially vertical plane.

10. Apparatus as in claim 9 together with a second releasable lock operating to secure the apex of said retroreflector vertically in said vertical plane.

11. Apparatus for use with a directional light beam projector casting a beam generally longitudinally relative to a vehicle chassis and having a beam reference axis parallel to the plane of rotation of one wheel of a wheel pair fixed in steering attitude on which the projector is mounted, and a light beam detector mounted to receive the light beam, said apparatus comprising a pair of elongate arms longitudinally movable in unison in opposite directions adapted to engage similar points on the inner surfaces of a wheel pair, a housing accepting the elongate arm pair for movement therethrough, a laterally extending support arm mounted on said housing, means for forming an aperture mounted on the outer end of said support arm, and means for adjusting the length of said support arm, whereby said aperture may be positioned at substantially the same distance from the chassis centerline as the light beam projector.

12. Apparatus as in claim 11 wherein said means for forming an aperture comprises a roof mirror, said aperture comprising the width of the image of the light beam detector at the apex of said roof mirror, together with means for adjusting the orientation of the apex of said roof mirror to assume a substantially vertical attitude, whereby the detector senses angular variation of the beam reference axis from a direction parallel to the chassis centerline.

13. Apparatus as in claim 11 wherein said means for forming an aperture comprises a narrow reflecting surface having a long dimension oriented substantially vertically, together with means for pivoting said narrow reflecting surface about an axis parallel to said long dimension.

14. Apparatus as in claim 11 together with means for yieldably urging the pair of elongate arms to move in unison outwardly from the housing.

15. A method of obtaining toe measurement of one nonsteerable wheel with respect to the centerline of a vehicle chassis supported by a pair of nonsteerable wheels and a pair of steerable wheels, wherein a light beam projector is mounted on the one nonsteerable wheel disposed to project a beam having a beam reference axis substantially parallel to the wheel rotation plane in the direction of the steerable wheels, wherein a light beam detector is disposed in the path of the light beam which provides an output signal when a portion of the light beam impinges thereupon, and wherein an aperture is disposed between the projector and the detector, comprising the steps of determining the lateral distance of the point of the projection of the light beam from the center point between the nonsteerable wheels, positioning the aperture in the path of the beam remote from the point of beam projection on a line from the point of projection through a point in a vertical plane at the aforesaid lateral distance from the center point between the steerable wheels, whereby the detector output signal is indicative of the angle of variation in the toe plane of the projected beam reference axis from a line through the center points between the wheel pairs.

16. The method of claim 15 together with the step of adjusting the attitude of the aperture to admit the portion of the projected beam to the beam detector.

17. The method of claim 15 wherein the detector is positioned adjacent to the projector together with the step of reflecting the portion of the beam from the aperture.

* * * * *